United States Patent [19]

Hughes et al.

[11] Patent Number: 4,490,997
[45] Date of Patent: Jan. 1, 1985

[54] BICYCLE LOCKING DEVICE

[76] Inventors: Leland G. Hughes; Jacqueline S. Hughes, both of 31929 Owl Rd., Eugene, Oreg. 97405

[21] Appl. No.: 488,259

[22] Filed: Apr. 25, 1983

[51] Int. Cl.³ .............................................. E05B 71/00
[52] U.S. Cl. ......................................... 70/233; 70/18
[58] Field of Search ................ 70/233, 18, 14, 63, 70/61, 225, 226, 227

[56] References Cited

U.S. PATENT DOCUMENTS

| | | | |
|---|---|---|---|
| 4,023,387 | 5/1977 | Gould | 70/233 |
| 4,024,741 | 5/1977 | Arblaster | 70/233 |
| 4,028,916 | 6/1977 | Pender | 70/233 |
| 4,186,576 | 2/1980 | Means | 70/233 |
| 4,404,822 | 9/1983 | Green | 70/18 |

*Primary Examiner*—Robert L. Wolfe
*Attorney, Agent, or Firm*—James D. Givnan, Jr.

[57] ABSTRACT

An elongate cylindrical housing receives a pre-coiled cable of substantial length with the cable end secured to a housing bottom wall. A lockable cable end is stowed in place adjacent the housing open end by a padlock. Said lockable cable end is entrainable through various bicycle components and a stationary structure and then back to the housing for padlock securement to the housing.

4 Claims, 3 Drawing Figures

U.S. Patent    Jan. 1, 1985    4,490,997
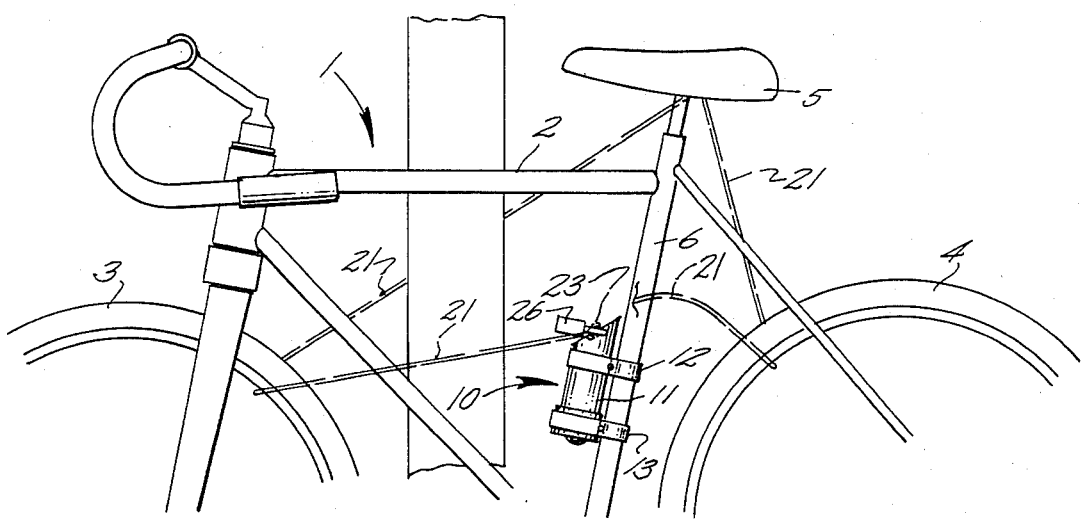
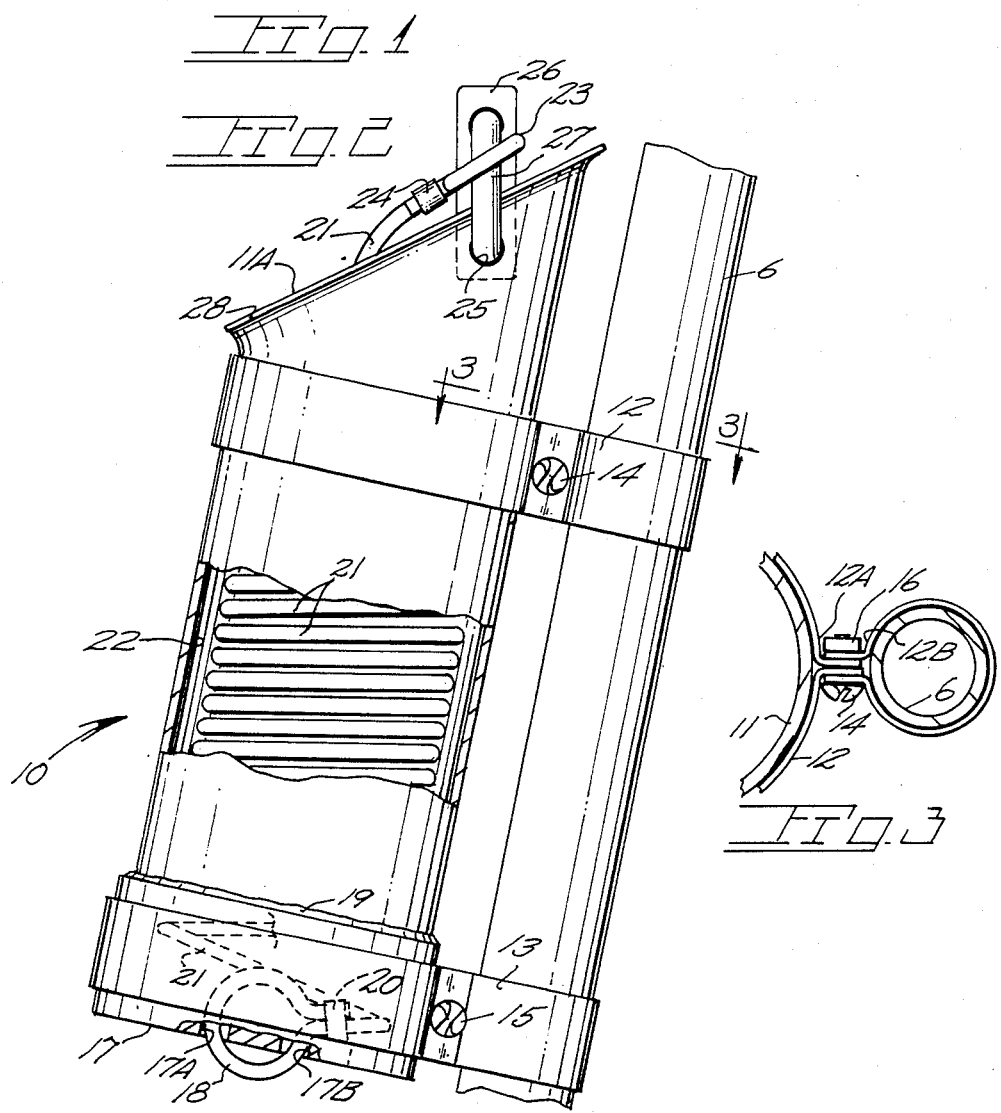

BICYCLE LOCKING DEVICE

BACKGROUND OF THE INVENTION

The present invention pertains generally to bicycle locking devices for securement of a bicycle to a structure.

With the increase in the popularity of the bicycle for recreational and utility purposes has come a significant rise in the number of bicycle thefts. Contemporary, multi-speed bicycles represent a considerable investment, not uncommonly in the range of hundreds of dollars. Bicycle thievery presently includes the practice of stealing bicycle components and particularly wheel assemblies thus making it desirable to secure the components against theft.

Known locking arrangements include the use of helically formed cables as disclosed in U.S. Pat. Nos. 3,756,008 and 4,028,916.

Additionally in the known prior art are several bicycle locking devices which utilize housings within which are cable reels with provision made in the housing, in most instances, to receive and lock in place a fitting on the cable end subsequent to cable passage about a fixed structure.

U.S. Pat. Nos. 3,906,758; 3,990,279; 4,023,387; 4,037,441; 4,086,795; 4,112,720; 4,126,024 and 4,188,808 are typical of the foregoing arrangement. U.S. Pat. No. 4,023,387 provides a cable housing embodying a movable pulley for cable take-up and also locking means for operative securement of the end of the extracted cable.

A common shortcoming of known bicycle locking arrangements utilizing an adequate length of cable is that a cable drum is resorted to for cable storage which drum adds both weight and complexity to the locking arrangement.

SUMMARY OF THE PRESENT INVENTION

The present invention is embodied within a bicycle lockinq device utilizing a substantial length of pre-coiled cable carried in a coiled manner within an open ended housing.

The housing of the present locking device is of tubular construction for placement closely adjacent a frame member of the bicycle (or the like) in a permanent manner. Desirably, a substantial length of cable may be conveniently carried within said housing to permit entraining of the cable through various bicycle components, e.g., wheels, seat, sprockets, etc., to secure same against theft. The housing additionally supports a lock in both stowed and operative positions.

Important objectives of the present locking device include the provision of a locking arrangement to secure the bicycle and components thereof against theft and which contributes only modestly to overall bicycle weight; the provision of a lock with a substantial length of cable housed in a compact manner when not in use without the use of reel assemblies objectionable from weight and cost of manufacture standpoints; the provision of a locking device lending itself to unobtrusive frame attachment; the provision of a locking device which avoids potentially injurious surfaces; the provision of a locking device wherein the cable has an inherent tendency to retract into a helical coil which feature is utilized to provide virtually "automatic" cable retraction into a housing.

BRIEF DESCRIPTION OF THE DRAWING

In the accompanying drawing:

FIG. 1 is a fragmentary side elevational view of a bicycle with the present locking device in place;

FIG. 2 is an enlarged fragmentary view of a bicycle frame member with the present locking device attached thereto; and FIG. 3 is a sectional view taken downwardly aloing line 3—3 of FIG. 2.

DETAILED DESCRIPTION OF THE PREFERRED EMBODIMENT

With continuing attention to the drawing wherein applied reference numerals indicate parts hereinafter similarly identified, the reference numeral 1 indicates generally a bicycle having a tubular frame 2 supported by front and rear wheels 3 and 4 with a seat at 5.

A frame member downtube at 6 may be utilized to support the present locking device indicated generally at 10. An open ended, tubular housing 11 of the device is disposed parallel to the downtube by metal brackets 12 and 13 each of which receives a fastener assembly of the tamper-proof type at 14 and 15. To prevent bracket separation from the bicycle frame member the brackets have ends which overlie one another per typical FIG. 3 with a nut element at 16 confined against rotation by adjacent bracket surfaces at 12A-12B. The fastener assemblies have tamper-proof heads of conventional type which prevent counterclockwise rotation of the fastener shanks. The fasteners may be case hardened to deter removal by drilling.

Housing 11 has a closed end at 17 in the form of a cap permanently secured as by a weld 19 to a housing end. The cap defines openings at 17A-17B within which a cable loop 18 passes with the loop formed by a swaged ferrule 20 in place on a length of cable 21.

Cable 21 is of that type having an inherent tendency to configure itself when relaxed into a series of helical coils imparted to the cable during manufacture. The cable coils are formed on a diameter slightly less than the diameter of inside wall surface 22 of housing 11 to permit unencumbered extension and retraction of the cable coils from the housing interior. A second end loop at 23 is formed at the remaining end of the cable by a swaged ferrule at 24. For retention of loop 23 in a convenient position, an aperture 25 is provided adjacent an open end 11A of the housing through which passes the shackle 27 of a padlock 26. The padlock is carried interiorly of the housing.

For the sake of safety as well as cable retraction the housing open end 11A is defined by a partially rolled or flared edge 28 formed in a plane inclined to the housing major axis with the uppermost housing end closest to the bicycle frame.

In use, cable 21 which may be approximately ten feet in length to permit entraining same through various bicycle components including the wheels, the seat, etc., and about a stationary structure such as a post or bike rack with the loop end 23 being located back adjacent aperture 25 for securement to the housing by padlock 26. Unlocking of the bicycle is greatly facilitated by the tendency of the cable to automatically coil as the unlocked end is fed back through the bicycle components to its stowed position of FIG. 2.

The housing is preferably six inches or so in length and about two inches in diameter to provide an adequate storage area for the lengthy cable which enables the cable end to be passed through various bicycle components including the wheels, seat, derailler, etc.. Drain openings may be provided in bottom wall 17 to prevent the collection of rain water.

While we have shown but one embodiment of the invention it will be apparent to those skilled in the art that the invention may be embodied still otherwise without departing from the spirit and scope of the invention.

Having thus described the invention, what is desired to be secured under a Letters Patent is:

We claim:

1. A bicycle locking device comprising in combination,
   an elongate tubular housing defining an opening at one end,
   a length of cable of the type formed with helical coils normally stowed in said housing with one cable end permanently secured to the housing, said cable terminating in a loop at its remaining end,
   locking means removably engageable with said housing and said housing opening both when the cable is in a stowed position and alternately when in use and passing about a stationary object to secure the bicycle thereto, and
   bracket means adapted to secure said housing to a bicycle frame member.

2. The locking device claimed in claim 1 wherein said housing defines an aperture adjacent said housing opening for the reception of said locking means.

3. The locking device claimed in claim 1 wherein said bracket means includes tamper-proof fastener assemblies each having a nut element confined against rotation by a remaining portion of the bracket means.

4. The locking device claimed in claim 1 wherein said housing is approximately six inches in length with said length of cable being approximately ten feet to enable entrainment of the cable through various bicycle components to secure same in an individual manner against theft.

* * * * *